(12) United States Patent
Humhauser et al.

(10) Patent No.: US 10,502,084 B2
(45) Date of Patent: Dec. 10, 2019

(54) MODULE FOR A GAS TURBINE

(71) Applicant: MTU Aero Engines AG, Munich (DE)

(72) Inventors: Werner Humhauser, Moosburg (DE); Hermann Klingels, Dachau (DE); Rudolf Stanka, Rattenkirchen (DE); Alois Eichinger, Pfaffenhofen (DE)

(73) Assignee: MTU AERO ENGINES AG, Munich (DE)

( * ) Notice: Subject to any disclaimer, the term of this patent is extended or adjusted under 35 U.S.C. 154(b) by 519 days.

(21) Appl. No.: 15/296,305

(22) Filed: Oct. 18, 2016

(65) Prior Publication Data

US 2017/0107843 A1    Apr. 20, 2017

(30) Foreign Application Priority Data

Oct. 20, 2015    (EP) .................................... 15190482

(51) Int. Cl.
*F01D 25/16*    (2006.01)
*F01D 11/18*    (2006.01)
(Continued)

(52) U.S. Cl.
CPC ................ *F01D 11/18* (2013.01); *F01D 5/28* (2013.01); *F01D 25/005* (2013.01); *F01D 25/24* (2013.01); *F01D 25/28* (2013.01); *F01D 25/30* (2013.01); *F01D 9/065* (2013.01); *F01D 25/162* (2013.01); *F01D 25/243* (2013.01);
(Continued)

(58) Field of Classification Search
CPC ...... F01D 25/162; F01D 25/24; F01D 25/243; F01D 25/246; F01D 25/28; F01D 9/065; F23R 3/60
See application file for complete search history.

(56) References Cited

U.S. PATENT DOCUMENTS 5,292,227 A * 3/1994 Czachor ................ F01D 25/162
415/142
5,357,744 A * 10/1994 Czachor .................. F01D 9/065
415/134
(Continued)

FOREIGN PATENT DOCUMENTS

EP    1149986 A2    10/2001
WO    9513454 A1    5/1995

*Primary Examiner* — Carlos A Rivera
*Assistant Examiner* — Behnoush Haghighian
(74) *Attorney, Agent, or Firm* — Abel Schillinger, LLP

(57) ABSTRACT

The invention relates to a module for a gas turbine comprising a rotationally symmetrical outer casing of a first material having a first linear thermal expansion coefficient, a rotationally symmetrical component for guiding hot gas of a second material having a linear thermal expansion coefficient which is lower than the first coefficient, at least one annular structure arranged radially within the component, and at least three struts having a radially inner end secured on the outer casing and a radially outer end secured on the annular structure. The component also comprises at least one first fixing which is free in radial direction and fixed in axial direction and arranged between the component and the outer casing and/or the annular structure, as well as at least three second fixings having an elastic effect in radial, axial and/or circumferential direction and being arranged between the component and the strut and/or the annular structure.

17 Claims, 4 Drawing Sheets

(51) Int. Cl.
  *F01D 25/00* (2006.01)
  *F01D 25/24* (2006.01)
  *F01D 25/28* (2006.01)
  *F01D 5/28* (2006.01)
  *F01D 25/30* (2006.01)
  *F01D 9/06* (2006.01)

(52) U.S. Cl.
  CPC ........ *F01D 25/246* (2013.01); *F05D 2220/32* (2013.01); *F05D 2300/5021* (2013.01); *Y02T 50/673* (2013.01)

(56) References Cited

U.S. PATENT DOCUMENTS

| | | | | |
|---|---|---|---|---|
| 5,609,467 A * | 3/1997 | Lenhart | .................. | F01D 9/065 |
| | | | | 415/142 |
| 5,634,767 A * | 6/1997 | Dawson | ............... | F01D 25/246 |
| | | | | 415/134 |
| 5,704,762 A | 1/1998 | Schultze | | |
| 6,439,841 B1 * | 8/2002 | Bosel | ...................... | F01D 9/065 |
| | | | | 415/142 |
| 6,672,833 B2 * | 1/2004 | MacLean | .................. | F23R 3/50 |
| | | | | 415/116 |
| 9,447,694 B2 * | 9/2016 | Sanchez | .................... | F02C 7/12 |
| 2002/0184892 A1 * | 12/2002 | Calvez | .................... | F23R 3/007 |
| | | | | 60/796 |
| 2006/0002765 A1 | 1/2006 | Aumont et al. | | |
| 2006/0010879 A1 * | 1/2006 | Aumont | .................. | F01D 9/023 |
| | | | | 60/796 |
| 2011/0081234 A1 | 4/2011 | Durocher et al. | | |
| 2013/0011242 A1 * | 1/2013 | Beeck | ..................... | F01D 25/28 |
| | | | | 415/142 |
| 2014/0013770 A1 * | 1/2014 | Farah | ..................... | F01D 25/16 |
| | | | | 60/796 |
| 2014/0093358 A1 * | 4/2014 | Chang | .................. | F01D 25/246 |
| | | | | 415/136 |
| 2014/0102110 A1 * | 4/2014 | Farah | ..................... | F01D 25/28 |
| | | | | 60/772 |
| 2014/0186160 A1 * | 7/2014 | Chuong | .................. | F01D 25/24 |
| | | | | 415/170.1 |
| 2014/0248146 A1 * | 9/2014 | Sander | ..................... | F02C 7/20 |
| | | | | 415/213.1 |
| 2014/0286763 A1 * | 9/2014 | Munshi | ..................... | F02C 7/12 |
| | | | | 415/178 |
| 2014/0314547 A1 * | 10/2014 | Sander | ................. | F01D 25/162 |
| | | | | 415/135 |
| 2015/0044032 A1 * | 2/2015 | Paradis | ................. | F01D 25/246 |
| | | | | 415/134 |
| 2015/0260057 A1 * | 9/2015 | Farah | ..................... | F01D 25/24 |
| | | | | 60/796 |
| 2015/0330241 A1 * | 11/2015 | Chuong | ................ | F01D 11/001 |
| | | | | 415/173.1 |
| 2015/0345399 A1 * | 12/2015 | Budnick | ................ | F01D 9/041 |
| | | | | 415/213.1 |
| 2016/0290169 A1 * | 10/2016 | Karafillis | .............. | F01D 25/162 |
| 2017/0030223 A1 * | 2/2017 | Parry | ..................... | F01D 25/24 |

* cited by examiner

MODULE FOR A GAS TURBINE

CROSS-REFERENCE TO RELATED APPLICATIONS

The present application claims priority under 35 U.S.C. § 119 of European Patent Application No. 15190482.8, filed Oct. 20, 2015, the entire disclosure of which is expressly incorporated by reference herein.

BACKGROUND OF THE INVENTION

1. Field of the Invention

The invention relates to a module for a gas turbine.

2. Discussion of Background Information

Owing to the high inlet temperature into the turbine of engines and owing to the limited pressure ratio in a high-pressure compressor, the outlet temperature of the high-pressure turbine becomes increasingly higher. During this process, the service temperature of uncooled metallic components of gas ducts is exceeded. Owing to the high requirement for cooling air, cooling these components has negative effects on the overall efficiency of the engine. Moreover, cooled structures increase the leakage losses through the cooling system.

In known aircraft gas turbines, cooled and uncooled metallic structures are currently being used for guiding hot gas. These components, which are composed of metal alloys resistant to high temperatures, are cast either as integral rings or segments. The components are designed in accordance with the temperature level, the radial temperature distribution, the absolute size of the components and/or the component loading.

It is disadvantageous here that the components have a high weight and that the use of uncooled components is permitted only for certain temperatures. If higher component temperatures are necessary, these components must be cooled in a complex way, which may increase weight and have a negative effect on fuel consumption.

In view of the foregoing, it would be advantageous to have available a module which comprises a component for guiding hot gas that withstands high temperatures without additional cooling.

SUMMARY OF THE INVENTION

The present invention provides a module for a gas turbine. The module comprises:
- a rotationally symmetrical outer casing of a first material having a first linear thermal expansion coefficient,
- a rotationally symmetrical component for guiding hot gas of a second material having a second linear thermal expansion coefficient which is lower than the first linear thermal expansion coefficient,
- at least one annular structure, e.g. in the form of a torsion box (8), which is arranged radially within the rotationally symmetrical component,
- at least three struts, each having a radially inner end and a radially outer end, the outer ends being secured on the outer casing and the inner ends being secured on the annular structure.

The rotationally symmetrical component comprises at least one first fixing, said fixing being free in radial direction and fixed in axial direction and being arranged between the rotationally symmetrical component and the outer casing and/or between the rotationally symmetrical component and the annular structure.

The module further comprises at least three second fixings, which have an elastic effect in at least one of the radial direction, the axial direction and the circumferential direction, the second fixing being arranged between the rotationally symmetrical component and at least one strut of the at least three struts and/or between the rotationally symmetrical component and the annular structure.

In one aspect of the module, the first material may comprise a metal alloy that is resistant to high temperatures and/or may have a linear thermal expansion coefficient of from 10 to 20 µm/m/K and/or the second material may comprise a fiber-reinforced ceramic and/or may have a linear thermal expansion coefficient of from 1 to 5 µm/m/K.

In another aspect of the module, the rotationally symmetrical component may comprise a radially outer wall and a radially inner wall which are connected to one another via at least three radially extending and hollow fairings. For example, the outer wall may have a first opening at the level of the fairing and/or the inner wall may have a second opening at the level of the fairing. Furthermore at least one strut of the at least three struts may pass through the radially outer wall and the radially inner wall. Also, a substantially axially extending arm may be formed integrally on at least one of the at least three struts, a free end of the arm being arranged in a receptacle which is formed in a cavity of the fairing. Additionally, a metal plate or sheet may be arranged between the wall of the receptacle and the free end of the arm.

In yet another aspect, the module may further comprise an inner ring, one end of the inner ring being secured on the annular structure, and a fixing receptacle being formed integrally on an inner wall. Additionally, the module may further comprise at least one radially or axially extending rod, one end of the rod being arranged in the fixing receptacle in such a way as to be movable in axial direction of the rod and the other end of the rod being connected to the other end of the inner ring. Also, a cylindrical cage which is secured on the fixing receptacle may be formed integrally on the other end of the inner ring. Additionally, a wall of the cylindrical cage may comprise at least one aperture.

In a still further aspect of the module, the first fixing may be arranged in the vicinity of the upstream edge of the rotationally symmetrical component and/or the first fixing may be arranged at the same axial level as the second fixing.

In another aspect, the module may be an intermediate casing of a turbine.

As set forth above, the invention relates to a module for a gas turbine. The module comprises a particularly rotationally symmetrical, substantially frustoconical, outer casing of a first material that has a high thermal expansion coefficient. The module furthermore comprises a rotationally symmetrical component for guiding hot gas of a second material that has a low thermal expansion coefficient. In addition, the module comprises at least one annular structure, e.g. a torsion box, which is arranged radially within the component, and at least three struts, in particular struts distributed uniformly over the circumference of the outer casing and arranged at the same axial level, each having a radially inner end and a radially outer end, wherein the outer ends are secured on the outer casing and the inner ends are secured on the annular stricture. The component further comprises at least one first fixing, said fixing being free in the radial direction and fixed in the axial direction. In this case, the first fixing is arranged between the component and the outer casing and/or between the component and the annular structure. Spoke centering is thereby achieved. The module comprises at least three second fixings, which have an elastic effect in the radial direction, the axial direction and/or in the circumferential direction, wherein the second fixing is arranged between the component and the strut and/or between the component and the annular structure.

The first fixing can be formed by a single first fixing, e.g. by a circumferential web which is accommodated in a groove of complementary design, preferably a groove which is likewise circumferential, or, alternatively, can be formed by a plurality of individual first fixings, in particular by at least three first fixings. The one first fixing or the plurality of first fixings jointly preferably forms a spoke-centered mounting for the component.

In the sense according to the present invention, the terms "high thermal expansion coefficient" and "low thermal expansion coefficient" should be taken to mean, in particular, that the base material of the casing has a thermal expansion coefficient which is at least 1.5, preferably at least 2, times as great as the thermal expansion coefficient of the base material of the component. For example, the casing can be formed from a metallic base material and the component can be formed from a ceramic base material.

In the sense according to the present invention, the term "rotationally symmetrical" should not be understood in a strictly geometric fashion but is intended merely to express the fact that the outer casing and the component are of substantially annular design, wherein the center line corresponds to the axis of the engine.

In the present invention, the term "elastic effect" is taken to mean, in particular, that the at least three second fixings should be designed to be sufficiently elastic or flexible to compensate the service-related differential thermal expansions in the radial direction, the axial direction and/or in the circumferential direction between the component and the strut or between the component and the annular structure without at the same time compromising the structural integrity of the component and of the strut or of the annular structure and without themselves exceeding the elastic deformation range. This elastic effect is preferably present both in the radial direction and in the axial direction and in the circumferential direction relative to an axis of rotation of the engine. Especially if the material of the component and/or of the strut or annular structure is relatively brittle, as is the case, for example, with a ceramic material, it is important that the at least three second fixings should not introduce into the component or strut or annular structure stresses of a magnitude that could lead to failure of the component over time.

The differential thermal expansion of the two materials is thereby decoupled in an effective manner, ensuring that the component is not damaged in the case of large temperature differences between the outer casing and the component.

In an advantageous embodiment of the invention, the first material comprises a metal alloy resistant to high temperatures and/or the second material comprises a fiber-reinforced ceramic or is preferably formed therefrom. Ceramics have low thermal expansion coefficients and relatively low thermal stresses. Thus, ceramics are particularly suitable for integral structures. However, ceramics are brittle and have a low strength. Nevertheless, the inventive design of the module means that such a material can be used without the component being damaged in service. Through the use of fiber-reinforced ceramics, the outlet temperature, e.g. that of a high-pressure turbine, can be significantly increased. At the same time, the component guiding hot gas does not need additional cooling. Moreover, the weight is significantly reduced owing to the low density of the ceramic in comparison with a metal.

In another advantageous embodiment of the invention, the first material has a linear thermal expansion coefficient of from 10 to 20 μm/m/K and/or the second material has a linear thermal expansion coefficient of from 1 to 5 μm/m/K.

In another advantageous embodiment of the invention, the integral component has a radially outer wall and a radially inner wall, which are connected to one another via at least three radially extending and hollow fairings. Segmented components comprise segments. In this case, the contact surfaces of the segments are susceptible to wear. Moreover, these contact surfaces are never completely airtight, and therefore there is always a certain segment leakage there. The component is integral when the outer wall, the inner wall and the fairing are manufactured from a single piece. The integral embodiment thus eliminates the susceptibility to wear of contact surfaces between the segments and segment leakage since there are then no segments.

In another advantageous embodiment of the invention, the outer wall has a first opening at the level of the fairing and/or the inner wall has a second opening at the level of the fairing. This has the advantage that sealing air between the outer casing and the radially outer wall of the component, said air being cold in comparison with the hot gas, can flow radially inward through the fairing.

In another advantageous embodiment of the invention, at least one strut passes through the outer and the inner wall. One hollow strut preferably extends in each fairing. Fluid lines can be placed in the cavity of the strut. The struts transfer the mechanical forces from the outer casing to the inner bearing of an engine. By virtue of the fairing, the strut does not come into contact with the hot gas. Moreover, the strut can be designed on the basis of structural mechanics without taking account of the aerodynamics. This shaping on the basis of fluid mechanics is assumed by the fairing.

In another advantageous embodiment of the invention, a substantially axially extending arm is formed integrally on at least one of the struts, wherein the free end of the arm is arranged in a radial receptacle, which is formed in the cavity of the fairing. Here, the arm and the receptacle form the second fixing. The arm is preferably formed integrally on the downstream side of the strut. The flow direction refers to the main flow direction of the hot gas. There are preferably 12 struts distributed uniformly over the circumference, in which case each strut then forms one such arm. In the circumferential direction, the receptacle does not have any degrees of freedom or has virtually no degrees of freedom. However, the arm can then be of elastic design, thus allowing the fairing to give way in the circumferential direction. The arm can slide in the radial and axial directions in the receptacle.

In another advantageous embodiment of the invention, a metal sheet or plate is arranged between the wall of the cavity and the free end. This offers the advantage that the surfaces of the free end and the surfaces of the cavity are spared.

In another advantageous embodiment of the invention, the module comprises an inner ring, wherein one end of the inner ring is secured on the annular structure, and a fixing receptacle is formed integrally on the inner wall.

In another advantageous embodiment of the invention, the module comprises at least one radially or axially extending rod, wherein one end of the rod is arranged in the fixing receptacle in such a way as to be movable and the other end of the rod is connected to the other end of the inner ring. In this case, the component, the rod and the inner ring form the second fixing. In the axial embodiment of the rod, one end can be of cylindrical or spherical (barrel-shaped) design, with the result that, in the first case, an axial movement is preferably possible and, in the second case, a pivoting movement about the fixing receptacle is possible in addition or as an alternative. Substantially radial mobility is thereby achieved. In the case of the radial design of the rod, one end can be of cylindrical or spherical (barrel-shaped) design, with the result that, in the first case, a radial sliding movement is preferably possible and, in the second case, a pivoting movement about the fixing receptacle is possible in addition or as an alternative. Substantially axial mobility of the other end of the rod is thereby achieved.

In another advantageous embodiment of the invention, a cylindrical cage, which is secured on the fixing receptacle, is formed integrally on the other end of the inner ring. Thus, the component and the inner ring, together with the cylindrical cage, form the second fixing. The wall of the cage preferably has at least one aperture. This makes the cage more flexible, especially if there is a plurality of apertures on the circumference, these preferably being distributed uniformly over the circumference. This enables the upstream edge of the cage to twist or even be deformed relative to the downstream edge of the cage. This enables a ceramic component, for example, to give way in the circumferential direction.

In another advantageous embodiment of the invention, the first fixing is arranged in the vicinity of the upstream edge of the component.

In another advantageous embodiment of the invention, the first fixing is arranged at the same axial level as the second fixing. The axial direction refers to the axis of the engine. This has the advantage that the component cannot tilt toward the shaft.

In another advantageous embodiment of the invention, the module is an intermediate casing of a turbine.

Further advantageous embodiments of the invention are given in the dependent claims.

BRIEF DESCRIPTION OF THE DRAWINGS

Preferred illustrative embodiments of the invention are described in greater detail below with reference to the schematic drawing, in which.

DETAILED DESCRIPTION OF EMBODIMENTS OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show details of the present invention in more detail than is necessary for the fundamental understanding of the present invention, the description in combination with the drawings making apparent to those of skill in the art how the several forms of the present invention may be embodied in practice.

Figure 1:
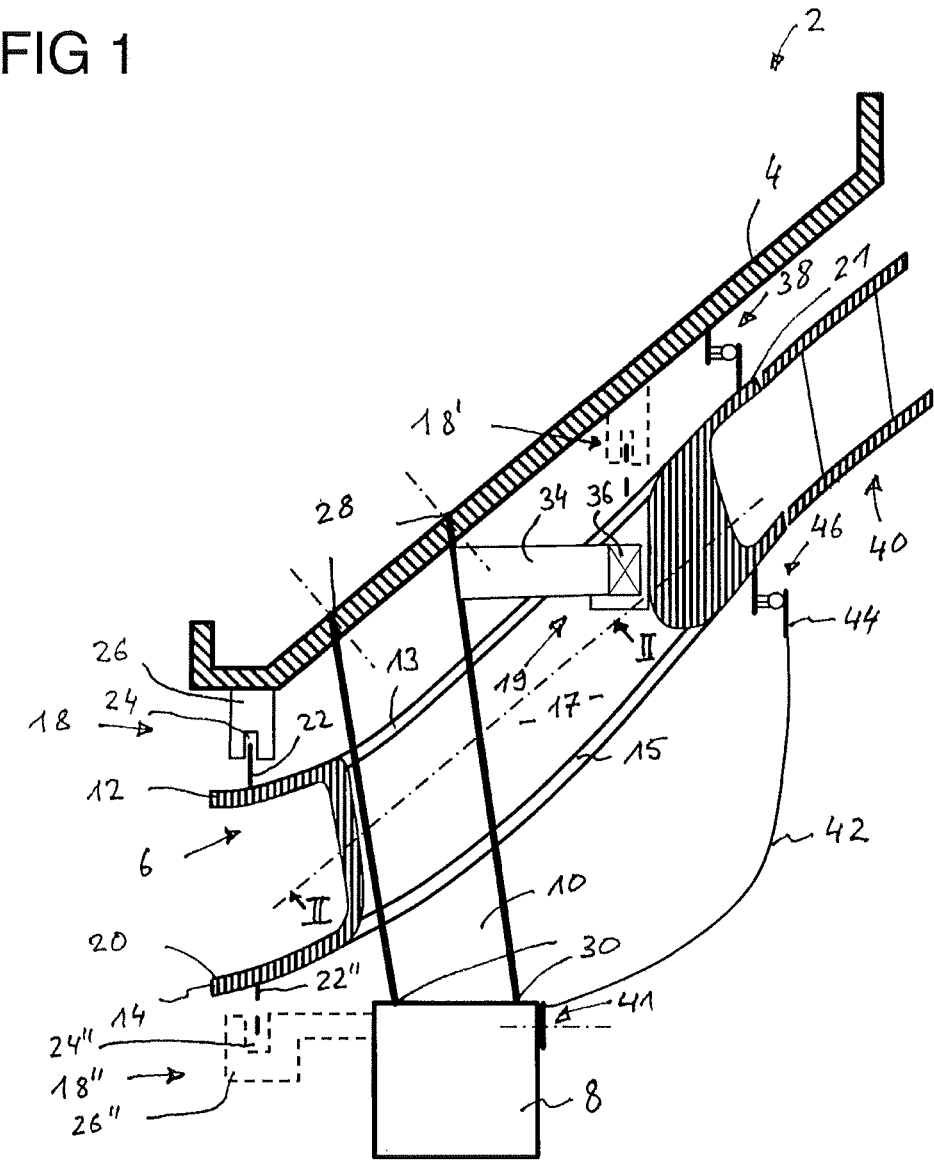
FIG. 1: shows a longitudinal section through a module according to the invention in accordance with a first embodiment.

FIGS. 1, 3, 4 and 5 show a rotationally symmetrical module 2, e.g. an intermediate casing for a turbine, having a metal outer casing 4, can be integral or segmented, a ceramic component 6 for guiding hot gas, an annular structure 8, which is designed in the form of a torsion box 8 here, and at least one strut 10, of which only a single one can be seen. There are preferably twelve struts, which are distributed uniformly over the circumference. In FIG. 1, only that part of the module 2 which is arranged over a horizontally extending engine axis is depicted here. The component 6 has a radially outer wall 12, a radially inner wall 14 and at least one radially extending fairing 16. There are preferably also twelve fairings, which are distributed uniformly over the circumference of the component 6. The component 6 is of integral design, i.e. the outer wall 12 having an opening 13, the inner wall 14 having an opening 15 and the fairings 16 are constructed from a single piece. In this case, the substantially radially extending and hollow fairing 16 connects the two walls 12 and 14 to one another with a cavity 17. The cavity 17 is aligned with the openings 13 and 15, thus allowing the cold sealing air present between the outer casing 4 and the outer wall 12 to flow radially inward via the cavity 17. The fairings 16 separate the sealing air from the hot gas flowing between the outer wall 12 and the inner wall 14. Here, the hot gas flows horizontally from left to right in FIGS. 1, 3, 4 and 5.

The component 6 is furthermore fixed axially relative to the outer casing 4. This can be achieved by means of a first fixing 18, which is arranged on the outer wall 12, in the vicinity of the upstream edge 20 of the component 6. For this purpose, at least three fixings 18 are required. Thus, for example, a pin 22 can be provided on the outer wall and is guided in a pin receptacle 24 of the fixing block 26, which is secured on the outer casing 4. The pin 22 can slide radially in the pin receptacle 24. The pin preferably has no degrees of freedom in the axial direction. What is referred to as "spoke centering" is thereby achieved. Other methods of spoke centering are conceivable. Thus, for example, this can be implemented by means of a sliding block.

In a second embodiment, the first fixing 18' is arranged at the same axial level as a second fixing 19, 50, 50' and 50".

In the third embodiment, the first fixing 18" is arranged on the inner wall 14, in the vicinity of the upstream edge 20 of the component 6. Thus, for example, a radially extending pin 22" can be provided on the inner wall 14 and is guided in a pin receptacle 24" of a fixing block 26", which is secured on the torsion box 8. The pin 22" can slide radially in the pin receptacle 24".

The radially outer end 28 of the strut 10 is screwed to the outer casing 4. This is indicated by the two dash-dotted lines. The radially inner end 30 of the strut 10 is connected to the torsion box 8.

A brush seal 38 is arranged between the outer casing 4 and the outer wall 12, in the vicinity of the downstream edge 21 of the component 6. The hot gas duct is extended by guide vanes 40 at the downstream end 21 of the component 6.

Figure 2:
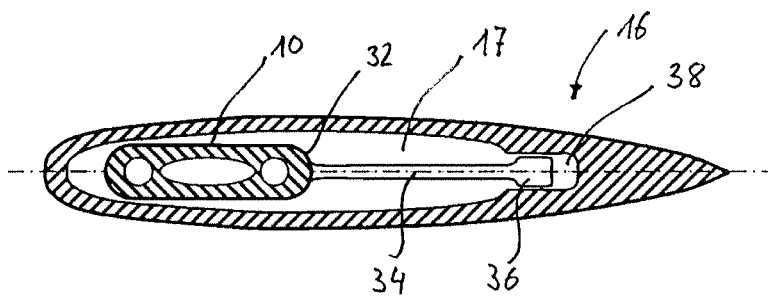
FIG. 2: shows across section through the faking from FIG. 1, FIG. 3: shows a longitudinal section through a module according to the invention in accordance with a second embodiment.

The first embodiment of the second fixing 19 from FIG. 1 will now be explained in greater detail. FIG. 2 shows a cross section through the fairing 16 along the line II-II in FIG. 1. An arm 34 having a thickened free end 36 is formed integrally on the downstream edge 32 of the strut 10, in the vicinity of the radially outer end 28. Here, the arm 34 extends substantially axially, wherein the free end 36 is arranged in a receptacle 38 of the fairing 16. The free end 36 can slide in the radial and axial directions within the receptacle 38 and is guided only in the circumferential direction. However, the arm 34 can be flexible, allowing the strut 10 to move in the circumferential direction within the cavity 17. To protect the surfaces of the free end 36 and the receptacle 38, a metal strip can be provided.

In this embodiment, one end 41 (embodied as a flange) of a sealing air plate 42 is secured on the torsion box 8. A brush seal 46 is provided at the other end 44 of the sealing air plate 42, said seal interacting sealingly with a projection on the lower wall 14, in the vicinity of the downstream edge 21 of the component 6.

Figure 3:
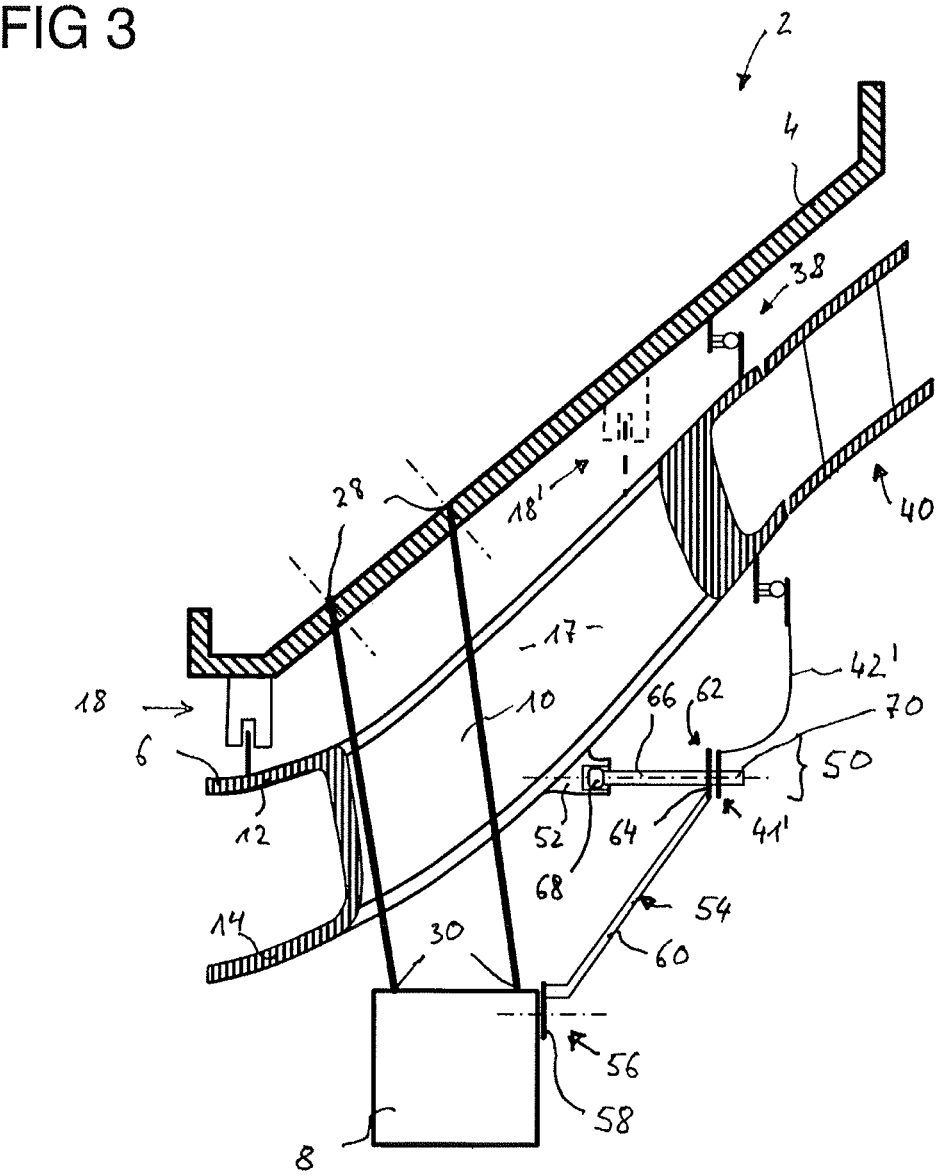

The second embodiment of the second fixing 50 from FIG. 3 will now be explained in greater detail. Here, only the differences with respect to the first embodiment will be explained. The strut 10 now no longer has an arm.

An axially extending fixing receptacle 52 is formed integrally on the inner wall 14, said fixing receptacle here being arranged in a substantially axially central position between the upstream end 20 and the downstream end 21. The module 2 furthermore has an inner ring 54. The (upstream) end 56 of the inner ring 54 has a flange 58, which here extends radially and is screwed to the torsion box 8. Formed integrally on the flange 58 is a frustoconical body 60 of the inner ring 54, which terminates at the downstream end 62 with a likewise radially extending flange 64. Here, this flange 64 is arranged at the same radial level as the fixing receptacle 52. However, the flange 64 is arranged further downstream in the axial direction in comparison with the fixing receptacle 52. One end 41' of the sealing plate 42' is likewise arranged at the same radial level as the flange 64 and rests directly against said flange 64. The module 2 furthermore comprises at least one rod 66 with a first end 68 arranged in the fixing receptacle 52. In this arrangement, this first end 68 can be cylindrically or spherically shaped, with the result that, in the first case, the rod 66 can slide in the axial direction and, in the second case, it can pivot in the radial direction about the fixing receptacle 52 in addition or as an alternative. The other end 70 of the rod 66 is guided by the two flanges 41' and 64 and clamped there.

Figure 4:
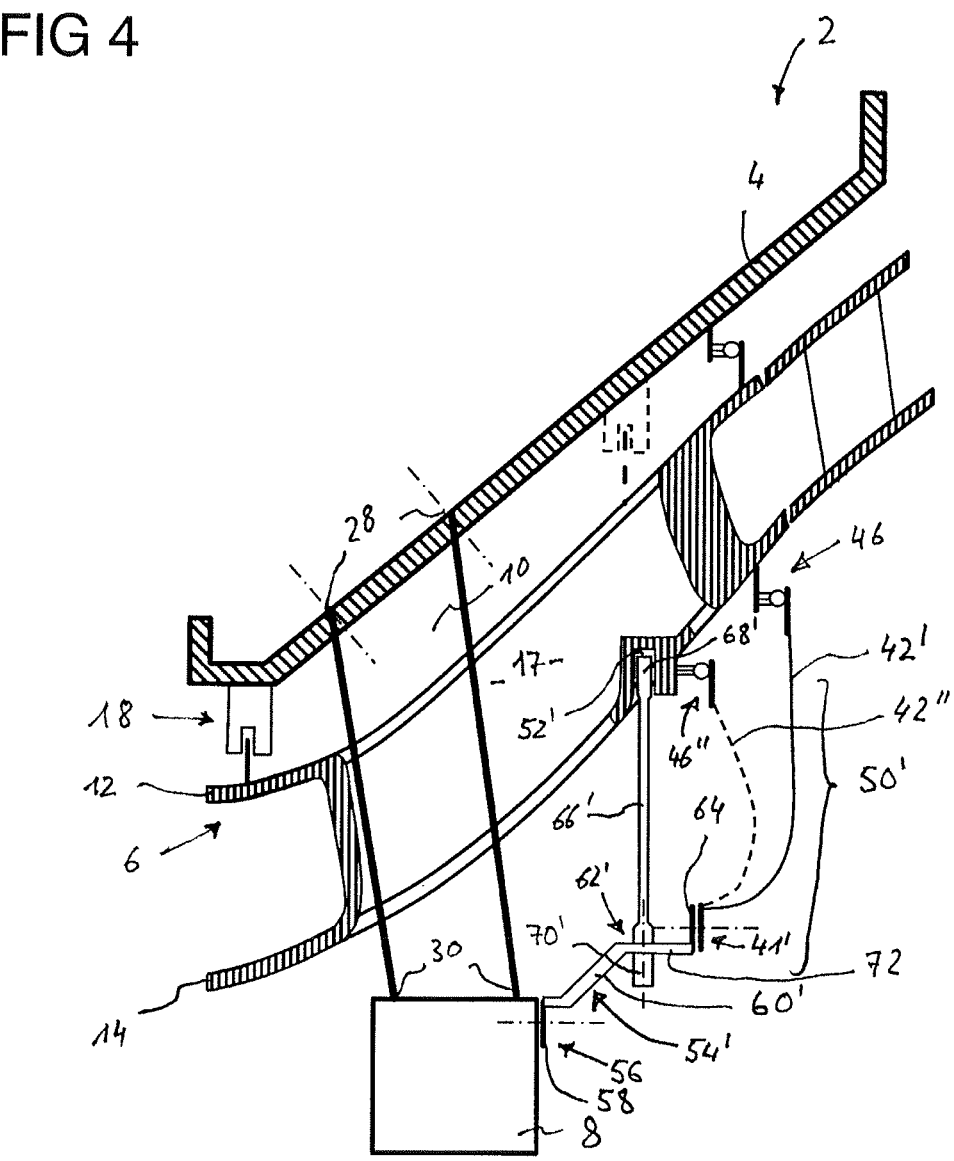
FIG. 4: shows a longitudinal section through a module according to the invention in accordance with a third embodiment.

The third embodiment of the second fixing 50' from FIG. 4 will now be explained in greater detail. Here, only the differences with respect to the first and second embodiments will be explained. The strut 10 now no longer has an arm.

A radially inward-extending fixing receptacle 52' is formed integrally on the inner wall 14, said fixing receptacle here being arranged closer to the downstream end 21 than to the upstream end of the component 6. The module 2 furthermore has an inner ring 54'. The (upstream) end 56 of the inner ring 54' has a flange 58, which here extends radially and is screwed to the torsion box 8. A frustoconical body 60' of the inner ring 54 is formed integrally on the flange 58. A cylindrical region 72 having at least one hole is formed integrally between the body 60' and the downstream end 62 having a likewise radially extending flange 64, said region extending horizontally here. In this case, the region 72 forms the other end 62' of the inner ring 54'. Here, the hole is arranged at the same axial level as the fixing receptacle 52'. However, the hole is arranged further in the radial direction in comparison with the fixing receptacle 52'. One end 41' of the sealing plate 42' is likewise arranged at the same radial level as the flange 64 and rests directly against said flange 64. The module 2 furthermore comprises at least one radially extending rod 66' with a first end 68' arranged in the fixing receptacle 52'. In this arrangement, this first end 68' can be cylindrically or spherically shaped, with the result that, in the first case, the rod 66' can slide in the radial direction and, in the second case, it can pivot in the axial direction about the fixing receptacle 52' in addition or as an alternative. The other end 70' of the rod 66' is introduced through the hole situated in the cylindrical region 72 and clamped there.

In combination therewith or as an alternative thereto, the sealing plate 42" (illustrated in dashed lines) can have a brush seal 46" arranged on the fixing receptacle 52'. The sealing plate 42" comprises the already known flange 41'.

The fourth embodiment of the second fixing 50" from FIG. 5 will now be explained in greater detail. Here, only the differences with respect to the first three embodiments will be explained. The strut 10 now no longer has an arm.

An axially extending fixing receptacle 52" is formed integrally on the inner wall 14, said fixing receptacle here being arranged in a substantially axially central position between the upstream end 20 and the downstream end 21. Here, the fixing receptacle 52" is designed as a flange. The module 2 furthermore has an inner ring 54". The (upstream) end 56 of the inner ring 54" has a flange 58, which here extends radially and is screwed to the torsion box 8. Formed integrally on the flange 58 is a frustoconical body 60 of the inner ring 54", which terminates with the likewise radially extending flange 64. Here, this flange 64 is arranged radially somewhat below the fixing receptacle 52". However, the flange 64 is arranged further downstream in the axial direction in comparison with the fixing receptacle 52. One end 41' of the sealing plate 42' is likewise arranged at the same radial level as the flange 64 and rests directly against said flange 64. A cylindrical cage 74 extending axially upstream is formed integrally on the radial upper end of the flange 64. In this case, the cage 74 forms the other end 62" of the inner ring 54". A radially outward-extending flange 78, which is arranged at the same radial level as the fixing receptacle 52", is formed integrally on the upstream end 76 of the cage 74. The flange 78 and the fixing receptacle 52" are screwed to one another.

Figure 5:
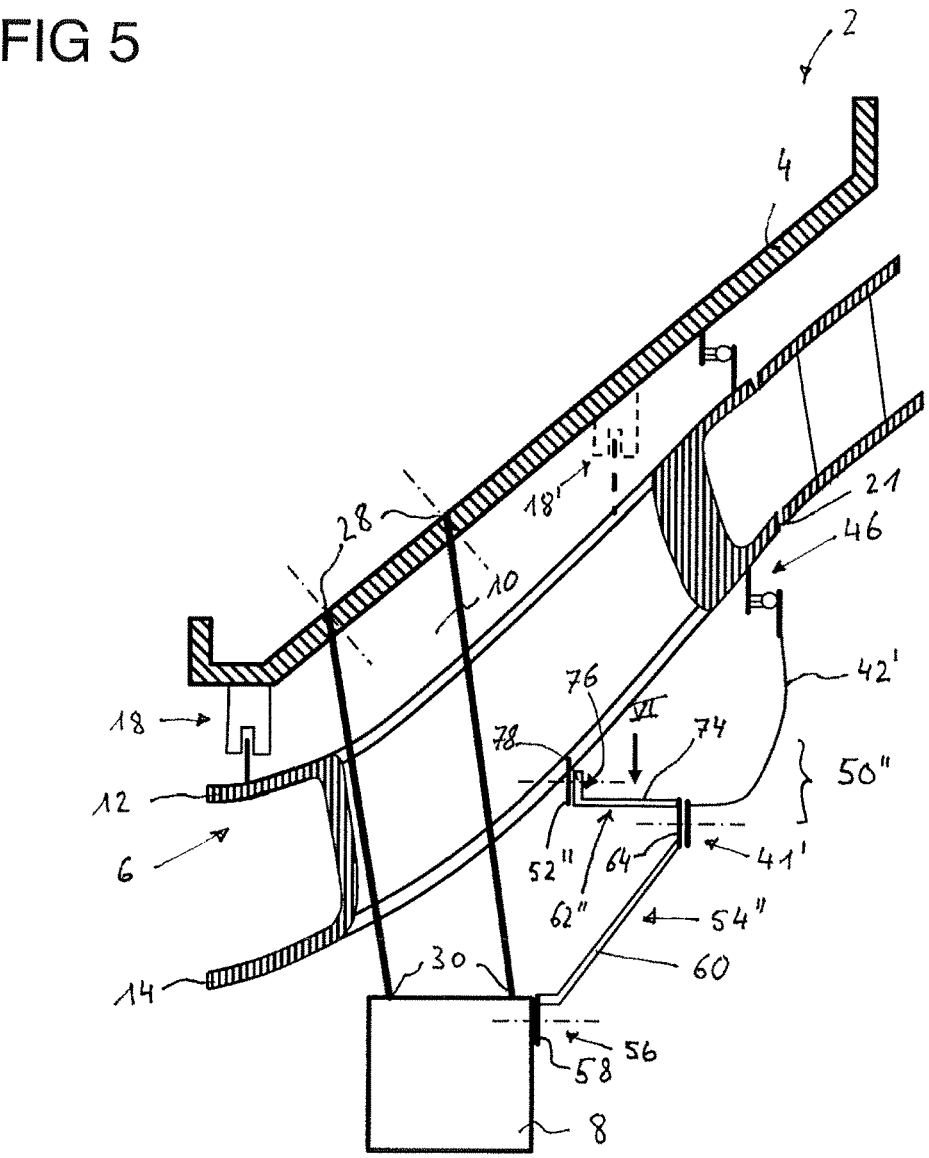
FIG. 5: shows a longitudinal section through a module according to the invention in accordance with a fourth embodiment.
Figure 6:
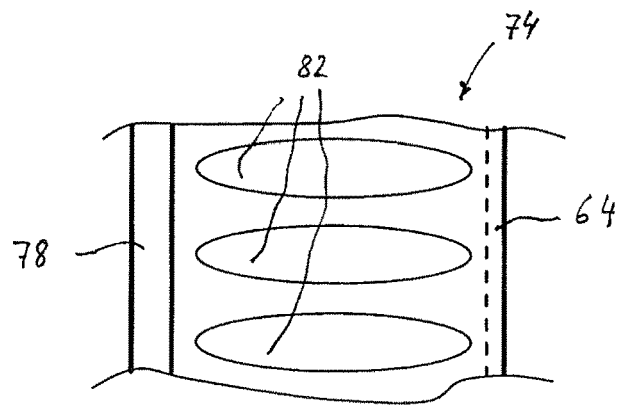
FIG. 6: shows a plan view of the cage from FIG. 5.

A plan view of the cage 74 in the direction of arrow VI from FIG. 5 is depicted in FIG. 6. The cage 74 can have a plurality of apertures 82.

The various alternatives described can be combined as desired.

Although the present invention has been described in detail with the aid of exemplary embodiments, it is clear to the person skilled in the art that the invention is not restricted to these exemplary embodiments, and rather that variants are possible in that individual features may be omitted or different combinations of features may be implemented, so long as the protective scope of the appended claims is not departed from. In particular, the present disclosure comprises all combinations of the proposed individual features.

LIST OF REFERENCE NUMBERS 2 module
4 outer casing
6 component
8 annular structure (torsion box)
10 strut
12 outer wall of 6
13 opening in 12
14 inner wall of 6
15 opening in 14
16 fairing of 6

17 cavity of 16
18 first alternative for a first fixing
19 second fixing
20 upstream edge of 6
21 downstream edge of 6
22 pin
24 pin receptacle
26 fixing block
28 radially outer end of 10
30 radially inner end of 10
32 downstream edge of 10
34 arm
36 end of 34
38 brush seal
40 guide vanes
42 sealing plate
44 other end of 42
46 brush seal
50 second embodiment of the second fixing
52 fixing receptacle
54 inner ring
56 upstream end of 54
58 flange
60 body
62 downstream end of 54
64 flange 64
66 rod
68 first end of 66
70 other end of 66
72 cylindrical region of 54'
74 cage
76 upstream end of 74
78 flange of 74
82 aperture
VI direction of view at 74

What is claimed is:

1. A module for a gas turbine, wherein the module comprises:
    a rotationally symmetrical outer casing of a first material having a first linear thermal expansion coefficient,
    a rotationally symmetrical component for guiding hot gas of a second material having a second linear thermal expansion coefficient which is lower than the first linear thermal expansion coefficient,
    at least one annular structure, which is arranged radially within the rotationally symmetrical component,
    at least three struts, each having a radially inner end and a radially outer end, the outer ends being secured on the outer casing and the inner ends being secured on the annular structure,
    wherein the rotationally symmetrical component comprises at least one first fixing, the fixing being free in radial direction and fixed in axial direction and being arranged between the rotationally symmetrical component and the outer casing and/or between the rotationally symmetrical component and the annular structure, and wherein the module further comprises at least three second fixings, which have an elastic effect in at least one of a radial direction, an axial direction and a circumferential direction, the second fixing being arranged between the rotationally symmetrical component and at least one strut of the at least three struts and/or between the rotationally symmetrical component and the annular structure.

2. The module of claim 1, wherein the first material comprises a metal alloy resistant to high temperatures.

3. The module of claim 1, wherein the second material comprises a fiber-reinforced ceramic.

4. The module of claim 1, wherein the first material has a linear thermal expansion coefficient of from 10 to 20 µm/m/K.

5. The module of claim 1, wherein second material has a linear thermal expansion coefficient of from 1 to 5 µm/m/K.

6. The module of claim 1, wherein the rotationally symmetrical component comprises a radially outer wall and a radially inner wall which are connected to one another via at least three radially extending and hollow fairings.

7. The module of claim 6, wherein the outer wall has a first opening at a level of a fairing and/or the inner wall has a second opening at a level of a fairing.

8. The module as claimed in claim 7, wherein at least one strut of the at least three struts passes through the radially outer wall and the radially inner wall.

9. The module of claim 6, wherein a substantially axially extending arm is formed integrally on at least one of the at least three struts, a free end of the arm being arranged in a receptacle which is formed in a cavity of a fairing.

10. The module of claim 9, wherein a metal plate or sheet is arranged between a wall of the receptacle and the free end.

11. The module of claim 1, wherein the module further comprises an inner ring, one end of the inner ring being secured on the annular structure, and a fixing receptacle being formed integrally on an inner wall.

12. The module of claim 11, wherein the module further comprises at least one radially or axially extending rod, one end of the rod being arranged in a fixing receptacle in such a way as to be movable in axial direction of the rod and the other end of the rod being connected to the other end of the inner ring.

13. The module as claimed in claim 11, wherein a cylindrical cage which is secured on the fixing receptacle is formed integrally on the other end of the inner ring.

14. The module as claimed in claim 13, wherein a wall of the cylindrical cage comprises at least one aperture.

15. The module of claim 1, wherein the first fixing is arranged in a vicinity of an upstream edge of the rotationally symmetrical component.

16. The module of claim 1, wherein the first fixing is arranged at the same axial level as the second fixing.

17. The module of claim 1, wherein the module is an intermediate casing of a turbine.

* * * * *